US007733800B2

(12) United States Patent
Huibregtse (10) Patent No.: US 7,733,800 B2
(45) Date of Patent: Jun. 8, 2010

(54) METHOD AND MECHANISM FOR IDENTIFYING AN UNMANAGED SWITCH IN A NETWORK

(75) Inventor: Thomas Paul Huibregtse, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1579 days.

(21) Appl. No.: 11/008,280

(22) Filed: Dec. 10, 2004

(65) Prior Publication Data

US 2006/0126534 A1    Jun. 15, 2006

(51) Int. Cl.
*H04L 12/26* (2006.01)

(52) U.S. Cl. .............. 370/254; 340/588; 370/219; 370/229; 370/352; 370/393; 370/449; 709/223; 709/224; 709/230; 709/238

(58) Field of Classification Search .......... 370/254, 370/390, 395.3, 230, 352, 392, 402, 218, 370/237, 389, 216, 255, 219, 229, 393, 449; 709/224, 221, 239, 223, 230, 238; 439/894; 714/5; 340/588
See application file for complete search history.

(56) References Cited

U.S. PATENT DOCUMENTS

| | | | | |
|---|---|---|---|---|
| 5,862,338 A | * | 1/1999 | Walker et al. | 709/224 |
| 6,125,104 A | * | 9/2000 | Shiragaki et al. | 370/216 |
| 6,381,642 B1 | * | 4/2002 | O'Donnell et al. | 709/224 |
| 6,982,953 B1 | * | 1/2006 | Swales | 370/218 |
| 7,002,960 B1 | * | 2/2006 | Golan et al. | 370/393 |
| 7,007,080 B2 | * | 2/2006 | Wilson | 709/221 |
| 7,079,537 B1 | * | 7/2006 | Kanuri et al. | 370/392 |
| 7,099,941 B1 | * | 8/2006 | Massengill | 709/224 |
| 7,102,996 B1 | * | 9/2006 | Amdahl et al. | 370/230 |
| 7,305,461 B2 | * | 12/2007 | Ullman | 709/223 |
| 7,330,481 B2 | * | 2/2008 | Jones et al. | 370/449 |
| 7,403,987 B1 | * | 7/2008 | Marinelli et al. | 709/223 |
| 7,415,022 B2 | * | 8/2008 | Kadambi et al. | 370/392 |
| 7,418,513 B2 | * | 8/2008 | Chang et al. | 709/230 |
| 7,440,442 B2 | * | 10/2008 | Grabelsky et al. | 370/352 |
| 7,508,756 B2 | * | 3/2009 | King et al. | 370/229 |
| 7,570,583 B2 | * | 8/2009 | Broberg et al. | 370/219 |
| 7,647,422 B2 | * | 1/2010 | Singh et al. | 709/238 |
| 2002/0101867 A1 | * | 8/2002 | O'Callaghan et al. | 370/389 |
| 2002/0194371 A1 | * | 12/2002 | Kadoi | 709/239 |
| 2003/0002443 A1 | * | 1/2003 | Basso et al. | 370/237 |
| 2003/0147394 A1 | * | 8/2003 | Jennings et al. | 370/392 |
| 2004/0264484 A1 | * | 12/2004 | Kui et al. | 370/402 |
| 2005/0015485 A1 | * | 1/2005 | Keefer et al. | 709/224 |
| 2005/0215128 A1 | * | 9/2005 | Levy et al. | 439/894 |
| 2006/0107089 A1 | * | 5/2006 | Jansz et al. | 714/5 |
| 2007/0297349 A1 | * | 12/2007 | Arkin | 370/255 |
| 2008/0001765 A1 | * | 1/2008 | Nguyen et al. | 340/588 |

FOREIGN PATENT DOCUMENTS

| | | |
|---|---|---|
| DE | 19839577 | 8/1999 |
| GB | 2361141 | 10/2001 |

* cited by examiner

*Primary Examiner*—Gerald Gauthier (57) ABSTRACT

An exemplary method for managing a network includes accessing information associated with a managed switch in the network, querying an external data source, and identifying an unmanaged switch connected to the managed switch based on a reply to the query and the accessed information.

24 Claims, 4 Drawing Sheets

METHOD AND MECHANISM FOR IDENTIFYING AN UNMANAGED SWITCH IN A NETWORK

BACKGROUND

Networks including a number of domains ("layer 2 domains") interconnected by routers, are known. Within each domain, traffic is forwarded based on MAC (Medium Access Control) addresses (or other data link layer addresses). The routers route traffic based on IP (Internet Protocol) addresses or other network layer addresses. To restrict network connectivity, a network administrator specifies connectivity groups each of which is a group of sub-networks that are allowed to communicate. The administrator also specifies which entities (MAC addresses, ports, or user names) belong to the same group. The entities may be in the same or different domains. A computer system automatically creates access control lists for routers to allow or deny traffic as specified by the administrator. The computer system also creates VLANs (Virtual Local Area Networks) to allow or deny traffic as specified, wherein each VLAN is part of a domain or is a whole domain. Connectivity within each domain is restricted by VLANs and connectivity between domains is restricted by access control lists.

A method and apparatus for determining accurate topology features of a network, including a monitoring system for determining accurate topology features of a network, and methods of operating the monitoring system, are known. In a known embodiment, the system creates an accurate topology map of a given network by: obtaining a list of managed network devices; identifying trunk ports, link channel ports, and trunk channel ports; identifying link port and node ports; determining connections between the ports; storing the collected information; and displaying the network topology. Methods are disclosed for identifying link and node ports. In the preferred method, information regarding the devices, including VLAN/backplane information, router ARP table information, device interface information, and physical address information for machines and devices connected to the network is obtained. Also, the ports and/or devices are logically grouped in order to provide more accurate topology information. Source address table timing information is obtained for each device, and a historical database of source table information is kept. Filters may then be utilized on the source address tables in order to provide more accurate topology results. Connections between nodes are also resolved by utilizing sorting methods. Alternative methods are also disclosed for identifying link ports and determining connections between nodes.

A method of determining computer network topologies that dramatically reduces the computational complexity and greatly increases the accuracy of connection determination, is known. The method involves classifying ports as either up or down. A source address table is compiled for each port of each data-relay device and each port is classified as either up or down. Up ports connect to other data-relay devices which report source address tables while down ports do not. After the classification, each source address in each up port table is replaced by the source address of the data-relay devices containing the down port whose table contains that source address. The tables of pairs of up ports are compared by intersection and minimal intersection defines the most probable connection for each up port. A variety of methods are used to remove invalid source addresses and the addresses of devices that have moved during the collection of the source address tables.

A method and apparatus for interrogating devices in a network are known, including a program suitable for interrogating, in a network, a selected device of a large number of possible devices in respect of at least one functionality of the device (e.g. topology or sizing), using a plurality of directories of elements, each element comprising a module of program code, each directory having a plurality of elements; wherein the program selects from at least one directory those elements which relate to the selected device and the desired functionality and utilizes the selected elements to interrogate the selected device.

A network supervising apparatus, a computer program, and a method of supervising a network, are known. The method includes applying an algorithm to information relating to the devices of the network to provide a stress value, comparing the stress value with a predetermined limit, retrieving graphic symbol signals from a signal store and providing the graphic symbol on a visual display apparatus when the stress value reaches the predetermined limit, manually selecting the graphic symbol and causing said visual display apparatus to provide an image indicating where the stress value has reached the predetermined limit.

SUMMARY

In an exemplary embodiment, a method for managing a network includes accessing information associated with a managed switch in the network, querying an external data source, and identifying an unmanaged switch connected to the managed switch based on a reply to the query and the accessed information.

In an exemplary embodiment, a method for managing a network by identifying an order of multiple devices connected to ports of a managed network switch in a network, includes for each port of the network switch, accessing Layer 2 and Layer 3 address information associated with the port, identifying one or more devices connected to the port based on the accessed Layer 2 and Layer 3 information, for each identified device, determining whether the identified device is included in an external list of switch-enabled devices, and ordering the identified device in an ordered list associated with the port based on the determining.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements

DETAILED DESCRIPTION

Figure 3:
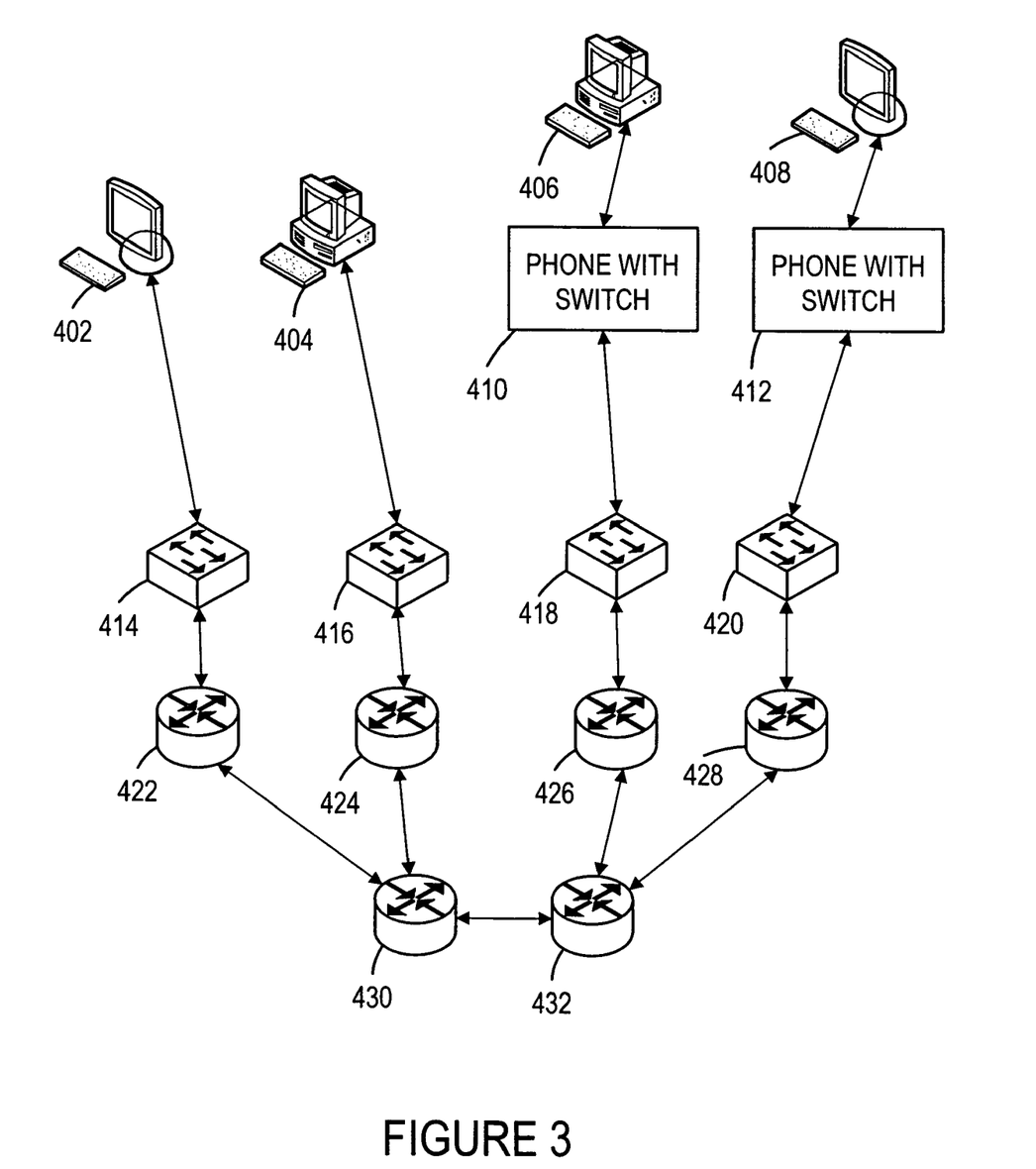
FIG. 3 illustrates an portion of a network on which exemplary embodiments would be applied.

As shown in FIG. 3, an exemplary network can include routers 430, 432, located for example at a core of the network, connected to distribution routers 22, 424, 426, 428. The distribution routers 422, 424, 426, 428 are shown connected respectively to a computer 402 (e.g. a personal computer), a computer 404, and phones 410, 412 that include switches, for example "unmanaged" switches. An unmanaged switch can be for example a switch that is not an SNMP (Simple Network Management Protocol) switch, or a switch that is not queried or monitored using SNMP. The phones 410, 412 can also be connected to personal computers, for example respectively to the computers 406, 408 shown in FIG. 3.

In computer networks, switches such as the routers 430, 432 and the switches 414 through 428 shown in FIG. 3, channel network packets from one device to another based on ISO Level 2 ("MAC" or Medium Access Control) addresses. The switches can learn the addresses of the devices connected network, and then filter and direct data communication so that collisions of data streams are minimized.

Figure 4:
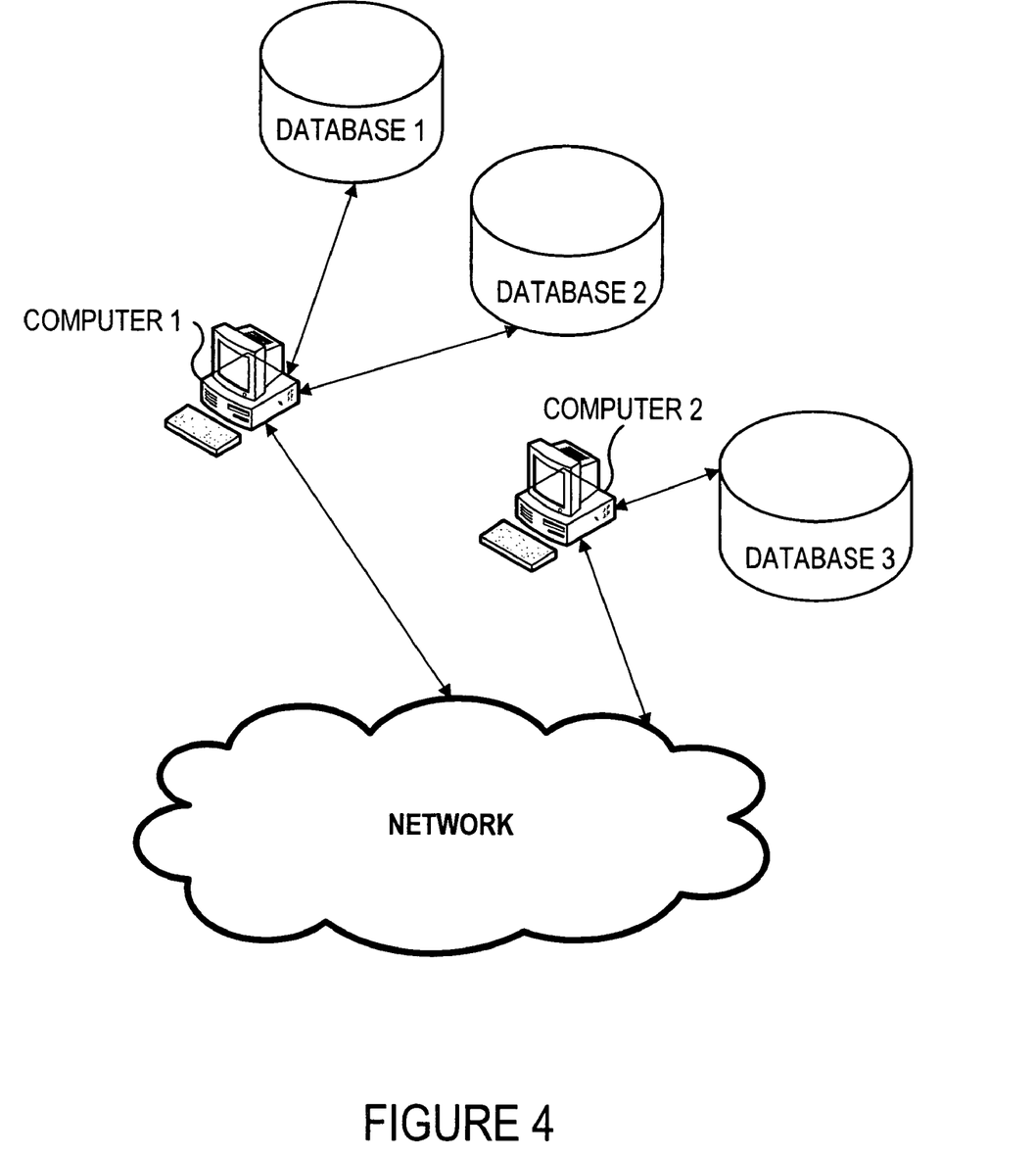
FIG. 4 illustrates an exemplary distribution of resources.

Many network switches have an ability to be managed by external software. Information about the state of the software, and Level 2 MAC information about the connected devices, is frequently made available through Simple Network Management Protocol (SNMP). The management software can then use individual MAC addresses to look up the corresponding IP address of the connected device, in an Address Resolution Protocol (ARP) cache. An ARP cache is a table containing pairs of Level 2 and Level 3 IP addresses. With the information in an ARP table, a Level or Layer 2 address of a device can be used to find a Level/Layer 3 address of the device, and vice versa. ARP caches can be created and can exist on several types of network devices, including routers and computers systems, for example the routers shown in FIG. 3 and the computers shown in FIGS. 3-4.

Information about accurate network topology can be useful to correctly diagnose problems in a network environment, and applications such as Hewlett Packard Company's Network Node Manager have been developed to diagram network topologies and perform root-cause analysis of network problems based on the state and connectivity of computer networks.

In some cases, a switch may either 1) not contain a management agent, 2) have a management agent that is not running, or 3) have agent data that is inaccessible (e.g., to management software) due to communication problems. Such a switch is effectively "unmanaged", and can present a challenge when one attempts to correctly identify the connectivity and state of a computer network, and to diagnose problems with the network. Implementation of IP telephones in networks has made this issue more urgent, because IP telephones frequently contain an unmanaged switch. This allows a company to run a single wire to an employee's location, where the employee's telephone acts as both a phone and as a switch to which the employee's computer is connected. In other words as shown in FIG. 3, a single link provides data from a network to both a telephone and a computer, and the telephone is located between the computer and the network. Thus there can be an additional unmanaged switch per employee when IP telephony is deployed in a corporate network.

Figure 2:
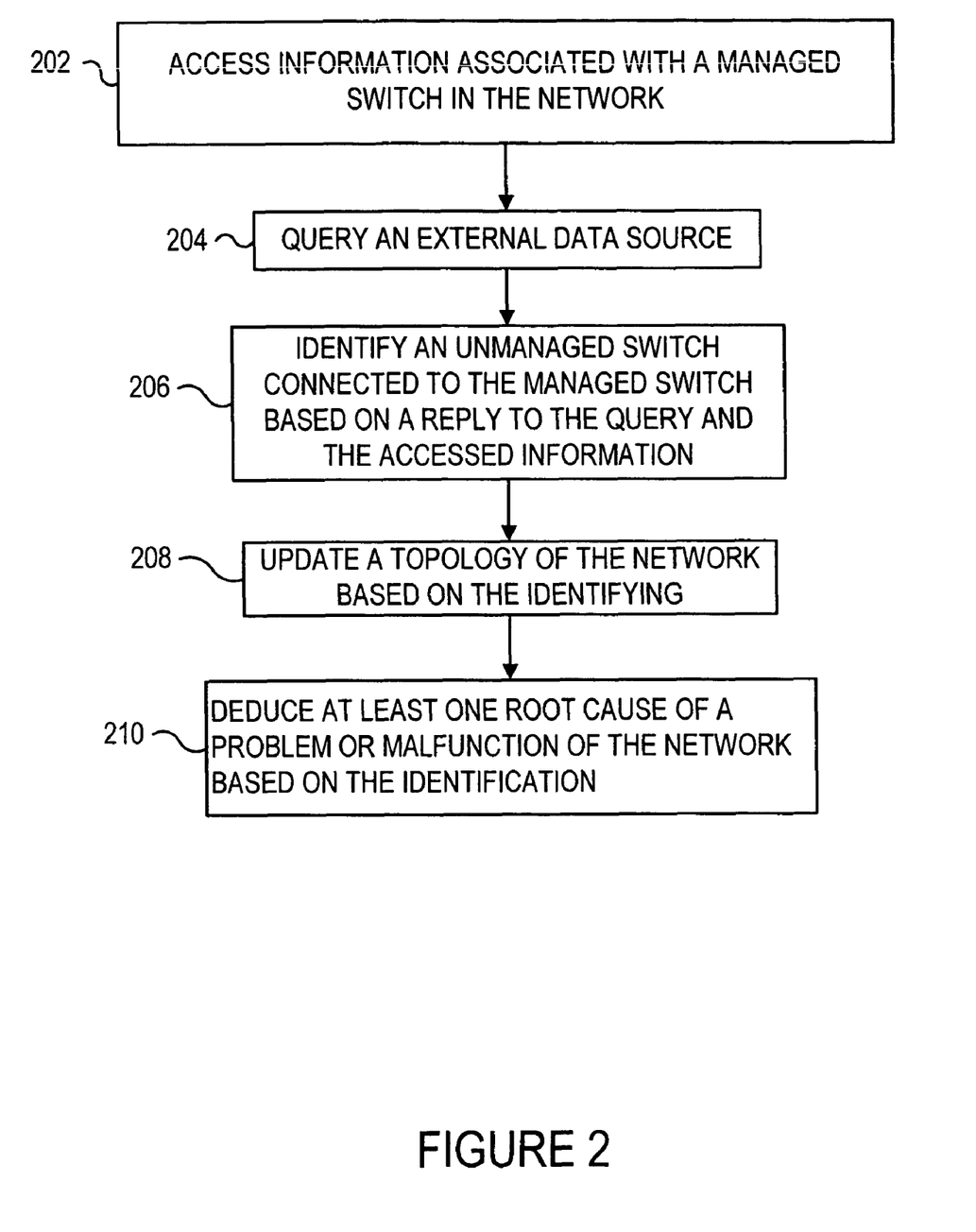
FIG. 2 is a flow diagram illustrating an exemplary embodiment.

In accordance with an exemplary method shown in FIG. 2, a correct topology of a network can be deduced. In a first block 202 shown in FIG. 2, information associated with a managed switch in the network is accessed. The information associated with the managed switch can for example be accessed by querying the managed switch, and the information associated with the managed switch can indicate a Level 2 or Layer 2 network address of a device connected to a port of the managed switch. The information associated with the managed switch can indicate a Virtual Local Area Network of the network with which the Layer 2 network address is associated.

Consider for example, a Cisco router having a) an interface "FastEthernet 0/1" that is an uplink trunk which brings multiple VLANs into the switch or router, and b) an interface "FastEthernet 0/2" that connects to a Cisco IP phone, wherein the phone in turn connects to a laptop PC. An exemplary partial configuration of the Cisco switch or router can be defined a follows:

!

interface FastEthernet0/1 description 802.1Q trunk to FA2/33 on Distribution Rtr 6509 switchport trunk encapsulation dot1q switchport mode trunk switchport nonegotiate

!

interface FastEthernet0/2 description 802.1Q trunk to Cisco phone: VLAN 500 is Voice switchport mode dynamic desirable switchport voice vlan 500 mls qos trust cos spanning-tree portfast

Partial results of the router's reply to a Cisco IOS command "show mac-address-table dynamic" are shown below:

| Vlan | Mac Address | Type | Ports |
|---|---|---|---|
| 1 | 0006.d737.ca0d | DYNAMIC | Fa0/2 |
| 1 | 000e.d759.2097 | DYNAMIC | Fa0/5 |
| 500 | 0004.0d4c.c8d6 | DYNAMIC | Fa0/4 |
| 500 | 0005.5f2b.60d8 | DYNAMIC | Fa0/1 |
| 500 | 0006.d737.ca0d | DYNAMIC | Fa0/2 |

The phone is plugged into an interface FA0/2, and we see from the reply the router has learned that there are two devices connected, and in this case they happen to be configured onto two VLANs.

Exemplary embodiments and methods described herein, enable management systems to determine which of the two devices is directly connected (e.g. the phone on VLAN 500), and which is connected indirectly (e.g. the PC on VLAN 1) through the other device.

Returning to FIG. 2, control proceeds from block 202 to block 204, where an external data source is queried, for example to obtain device-specific information. The external data source can be associated with the network, can be within the network and separate from the information associated with the managed switch(es), can be physically external to the network or connected to the network, can be centralized or distributed, and so forth. For example, with reference to FIG. 4 which shows an exemplary network with connections to computers Computer 1 and Computer 2 where Computer 1 is connected to Database 1 and Database 2 and Computer 2 is connected to Database 3, the external data source can be in one or more of the Databases 1-3, can be within the network, or can be distributed within or among both the network and Computers 1, 2 and Databases 1-3.

In a next block 206, an unmanaged switch connected to the managed switch is identified based on a reply to the query and the accessed information. The query reply can indicate a type of the device associated with the Layer 2 network address, and/or can indicate information about a Virtual Local Area Network (VLAN), for example a VLAN with which the port of the managed switch and/or devices connected to the port is/are associated. For example, the query reply can indicate whether the VLAN is assigned for Internet Protocol (IP) telephony. When the VLAN is assigned for IP telephony, the device connected to the port of the managed switch can be identified as (or determined to be) an unmanaged switch. In an exemplary method, the query can include a Layer 2 network address of a device connected to a port of the managed switch, and the external data source can include a table associating Layer 2 addresses with Layer 3 addresses, for example for devices within the network. In this way the query reply can include a Layer 3 address that is associated with or corresponds to the Layer 2 address provided in the query. The table can be embodied in one or more ARP caches, distributed for example within and/or among one or more devices or resources within the network, for example routers and managed switches or any other network resource.

In a next block 208, a topology of the network is updated based on the identification performed in block 206. In a next block 210, at least one root cause of a problem or malfunction of a network is deduced based on the identification.

Thus, information contained in a managed switch can be combined with device-specific external information to deduce a correct topology of a network. Additional actions can be performed using the deduced topology information, for example a) updating a topology representation of the network, and/or b) deducing one or more root causes of a problem with or malfunction of the network. The method shown in FIG. 2 can be repeated or performed for different switches of the network, for example until connections to all of the switches have been explored or evaluated (directly or indirectly).

Figure 1:
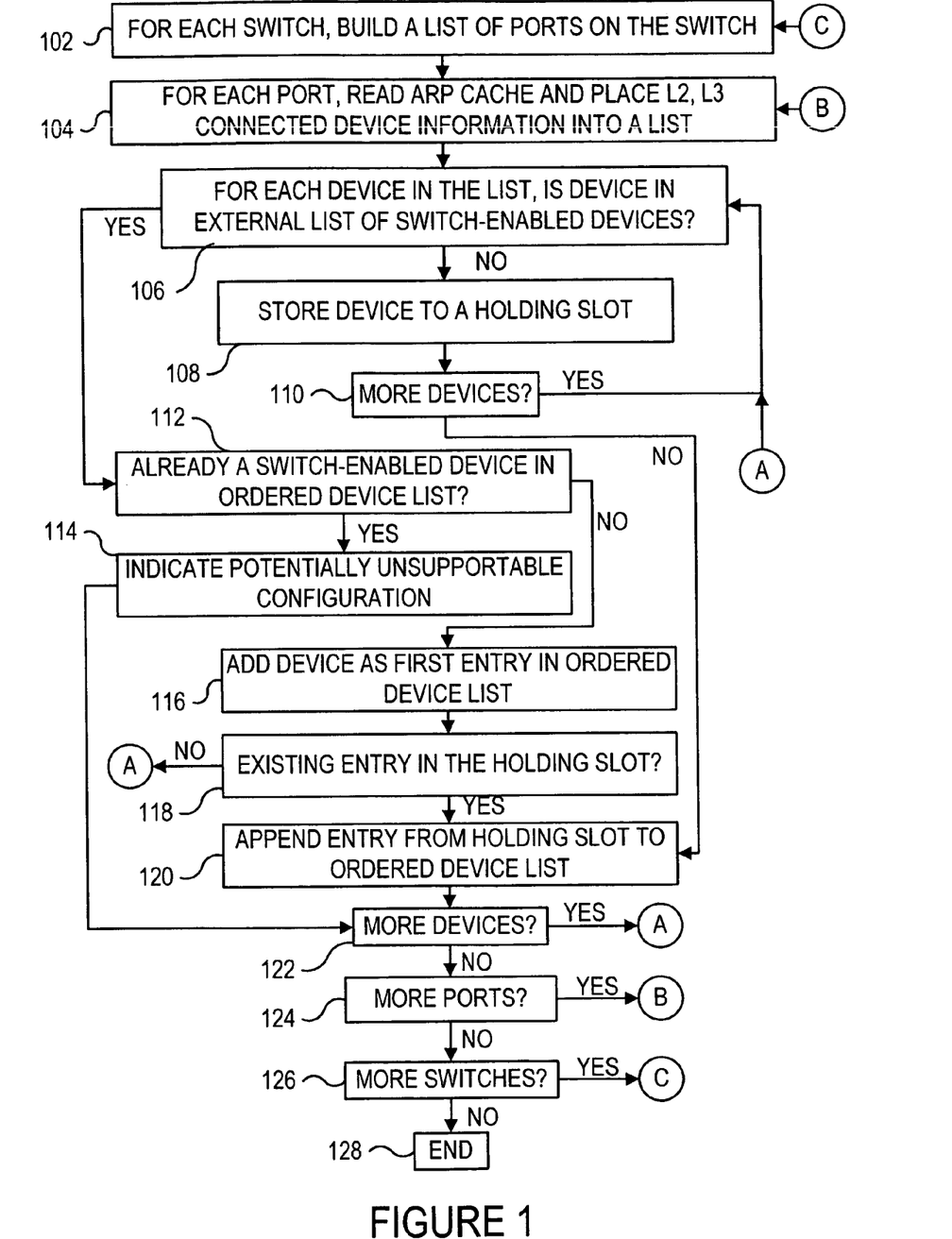
FIG. 1 is a flow diagram illustrating an exemplary embodiment.

FIG. 1 shows another exemplary method, wherein in a first block 202, for each switch a list of ports on the switch is built. The list can be built, for example, by accessing information associated with the switch, for example by querying the switch (which can be a managed switch) via SNMP or other mechanism. In a next block 104, for each port of the switch one or more ARP caches is read and Layer 2 and Layer 3 information from the ARP cache(s), for example regarding devices connected to the switch, are placed into a list. From block 104 control proceeds to block 106, where for each device represented in the list built in block 104, a determination is made whether the device is in an external list of switch-enabled devices or in other words an external list of devices that embed a switch (for example, managed switches). An exemplary device that enables a switch is a Cisco 7960 IP telephone which includes two network ports, one for connecting to an incoming VLAN trunk carrying both voice and PC network data and one that is a PC-only port.

If not, then control proceeds from block 106 to block 108, where the device information is stored in a holding slot. From block 108, control proceeds to 110, where a determination is made whether there are more devices to evaluate. If yes, then control returns from block 110 to block 106. In not, then control proceeds from block 110 to block 120.

If the determination in block 106 indicates that the device is in the external list of switch-enabled devices or devices that embed a switch, then control proceeds from block 106 to block 112. In block 112, a determination is made whether there is already a switch-enabled device in an ordered device list associated with the corresponding managed switch port. If yes, then control proceeds to block 114, where an alert is generated to indicate that this particular portion of the network may have an unsupportable configuration, and from block 114 control proceeds to block 122. If the determination in block 112 is negative, then control proceeds from block 112 to block 116, where the corresponding device (or information relating to it) is placed or added as the first entry in an ordered list associated with the managed device port.

From block 116, control proceeds to block 118, where a determination is made whether the holding slot contains an entry. If not, then control returns from block 118 to block 106. If yes, then control proceeds from block 118 to block 120, where the information in the holding slot (corresponding to a device that is not switch-enabled) is appended to the ordered device list, for example an ordered device list associated with a corresponding managed switch port (see, e.g., blocks 104, 106). From block 120 control proceeds to block 122, where a determination is made whether there are more devices to evaluate with respect to a particular managed switch port. If yes, then control returns from block 122 to block 106. If not, then control proceeds from block 122 to block 124, where a determination is made whether there are more ports with respect to a particular switch, e.g., managed switch. If yes, then control returns from block 124 to block 104. If not, then control proceeds to block 126, where a determination is made whether there are more switches (e.g., managed switches) to evaluate. If yes, then control returns from block 126 to block 102. If not, the control proceeds to block 128 and the process ends.

Exemplary pseudocode for implementing the method shown in FIG. 1 follows:

// This pseudo-code discovers the devices that are "outside" an edge switch, and returns an accurate description of the topology that may include a network switch that cannot be managed by SNMP.

// As an argument, it takes the IP address of a traditional Edge switch, e.g. a

// Cisco 3524 or 3550

// This routine "asks" an outside source whether a device contains an

// unmanaged switch, and then constructs the topology with the device as a

// connector, and not a leaf node.

// This reflects the most common case, which involves IP phones containing

// unmanaged switches.

// This routine is initially focused on situations where there are 2 nodes

// connected to an edge switch—usually a phone containing an unmanaged

// switch, and a PC as the end node.

// First action: build a table of devices known to be unmanaged switches. In

// the case of an IP telephony environment, we would use SNMP to query a

// Call Manager to see which phones (containing unmanaged switches) are

// known, and their MAC or IP addresses.

Switch Table=Build_Unmanaged_Switch_Table ( );

// Later, during network topology discovery, we will see what lies outside

// each port on the traditional Access layer switches.

```
for each port on each managed edge switch {
    get_Access_Port_topology ( );
}
get_Access_Port_topology {
```

// Possible topologies include:

// 1. Just a normal IP device (such as a PC) that doesn't contain an

// unmanaged switch;

// 2. Just device containing an unmanaged switch;

// 3. A device containing an unmanaged switch, connected to a device that

// doesn't contain an unmanaged switch.
```
    int deviceCount;
    array deviceArray[];
    array MAC_list[];
```

// Find all of the MACs of devices connected to that port.
```
    MAC_list=get list_of MAC_addresses;
```

// Simplest Case: 1 device. We could use the non-SNMP information about

// it to identify what kind of device it is (e.g. IP telephone).

// We return that there is a list with 1 element in it.

```
if (there is exactly 1 MAC on that port) {
    (return the number of devices (1) and its address)
}
```

// More complex scenario, e.g. 2 devices & 1 is/includes switch

```
else {
    if MACAddress[0] is in SwitchTable {
```

// First MAC found is the switch,
// Second MAC is the leaf node device

```
        deviceArray[0] = MACAddress[0];
        deviceArray[1] = MACAddress[1];
        (return the number of devices (2), also
        addresses of connector and leaf node)
    }
    else if MACAddress[1] is in SwitchTable {
```

// First MAC found is leaf node device
// Second MAC is the switch

```
        deviceArray[1] = MACAddress[0];
        deviceArray[0] = MACAddress[1];
        (return the number of devices (2), also
        addresses of connector and leaf node)
```

```
        }
        else {
```

// Some other funky scenario, e.g. an unmanaged hub with devices connected: return a corresponding, slightly different structure.

```
        }
    }
} //end get_Access_Port_topology
```

The functions or activities described with respect to FIGS. 1-2 can be performed by devices or resources within the network, for example by computers or devices within the network that have memory and/or some computing capacity (for example routers and managed switches such as those shown in FIG. 3, computers such as the computers 402, 404, 406, 408 or others within the network, devices containing microprocessors or microcontrollers, etc.), and the various functions can be performed by software running in a central or distributed fashion on those devices or resources. The various different functions described herein, can for example be performed by different modules of one or more software programs, and/or can be performed by different software programs. The software can also or alternatively run on devices external to the network whose switches are being evaluated, for example on the Computers 1, 2 shown in FIG. 4, for example with the aid of one or more of the Databases 1-3. One or more of the Computers 1, 2 and/or the computers 402, 404, 406, 408 and/or other computers or displays within or connected to the network can also be used to display a topography of the network, and/or the results or status of any of the functions or operations described herein with respect to FIGS. 1-2.

Software packages, elements or modules for variously providing access or views to the databases, e.g. for connecting clients to an active database and for connecting a discovery process to the working database, for maintaining the network topologies in the databases, and/or for performing other process functions described herein, can be implemented on the computer. For example, the processes such as discovering the network, monitoring a health of the network, detecting malfunctions or faults in the network, comparing topologies from different databases and troubleshooting detected malfunctions or faults, for example based on the topology comparison, can be variously implemented separately or jointly by software or software modules or elements running on the computer. These software processes running on the computer can be additionally or alternatively be implemented in a distributed fashion external to the network using for example distributed computing resources, and/or can be implemented using resources of the network.

Thus, the methods, logics, techniques and pseudocode sequences described above can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location.

Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. Method for managing a network, comprising:
   accessing information associated with a managed switch in the network;
   querying an external data source;
   identifying an unmanaged switch connected to the managed switch based on a reply to the query and the accessed information.

2. The method of claim 1, wherein the information associated with the managed switch is accessed by querying the managed switch.

3. The method of claim 1, wherein the information associated with the managed switch indicates a Layer 2 network address of a device connected to a port of the managed switch.

4. The method of claim 3, wherein the query reply indicates a type of the device associated with the Layer 2 network address.

5. The method of claim 3, wherein the information associated with the managed switch indicates a Virtual Local Area Network of the network with which the Layer 2 network address is associated, and the query reply indicates information about the Virtual Local Area Network.

6. The method of claim 5, wherein the query reply indicates whether the Virtual Local Area Network is assigned for Internet Protocol telephony, and when the Virtual Local Area Network is assigned for Internet Protocol telephony, the device connected to the port of the managed switch is determined to be an unmanaged switch.

7. The method of claim 3, wherein the query includes the Layer 2 network address of the device connected to the port of the managed switch and the external data source includes a table associating Layer 2 addresses with Layer 3 addresses within the network.

8. The method of claim 7, wherein the table comprises at least one 10 Address Resolution Protocol cache.

9. The method of claim 1, comprising deducing at least one root cause of a problem with or malfunction of the network based on the identification.

10. The method of claim 1, comprising performing the steps of accessing, querying, and identifying for different switches in the network.

11. The method of claim 1, wherein the external data source is 20 associated with the network.

12. The method of claim 1, comprising updating a topology of the network based on the identifying.

13. A system for managing a network, comprising:
    means for accessing information associated with a managed switch in the network and querying an external data source; and
    means for identifying an unmanaged switch connected to the managed switch based on a reply to the query and the accessed information.

14. The system of claim 13, wherein the information associated with the managed switch indicates a Layer 2 network address of a device connected to a port of the managed switch.

15. The system of claim 13, wherein the query reply indicates a type of the device associated with the Layer 2 network address.

16. The system of claim 13, wherein the information associated with the managed switch indicates a Virtual Local Area Network of the network with which the Layer 2 network address is associated, and the query reply indicates information about the Virtual Local Area Network.

17. The system of claim 16, wherein the query reply indicates whether the Virtual Local Area Network is assigned for Internet Protocol telephony, and when the Virtual Local Area Network is assigned for Internet Protocol telephony, the device connected to the port of the managed switch is determined to be an unmanaged switch.

18. The system of claim 13, wherein the query includes the Layer 2 network address of the device connected to the port of the managed switch and the external data source comprises a table associating Layer 2 addresses with Layer 3 addresses within the network.

19. A machine readable medium comprising a computer program for causing a computer to perform:
    accessing information associated with a managed switch in the network;
    querying an external data source;
    identifying an unmanaged switch connected to the managed switch based on a reply to the query and the accessed information.

20. The medium of claim 19, wherein the information associated with the managed switch indicates a Layer 2 network address of a device connected to a port of the managed switch.

21. The medium of claim 20, wherein the query reply indicates a type of the device associated with the Layer 2 network address.

22. The medium of claim 20, wherein the information associated with the managed switch indicates a Virtual Local Area Network of the network with which the Layer 2 network address is associated, and the query reply indicates information about the Virtual Local Area Network.

23. The medium of claim 22, wherein the query reply indicates whether the Virtual Local Area Network is assigned for Internet Protocol telephony, and when the Virtual Local Area Network is assigned for Internet Protocol telephony, the device connected to the port of the managed switch is determined to be an unmanaged switch.

24. The medium of claim 20, wherein the query includes the Layer 2 network address of the device connected to the port of the managed switch and the external data source includes a table associating Layer 2 addresses with Layer 3 addresses within the network.

* * * * *

UNITED STATES PATENT AND TRADEMARK OFFICE
CERTIFICATE OF CORRECTION

PATENT NO. : 7,733,800 B2  Page 1 of 1
APPLICATION NO. : 11/008280
DATED : June 8, 2010
INVENTOR(S) : Thomas Paul Huibregtse

It is certified that error appears in the above-identified patent and that said Letters Patent is hereby corrected as shown below:

In column 9, line 56, in Claim 8, after "one" delete "10".

In column 9, line 64, in Claim 11, after "source is" delete "20".

Signed and Sealed this

Twenty-fourth Day of August, 2010

David J. Kappos
*Director of the United States Patent and Trademark Office*